(12) United States Patent  
Lin

(10) Patent No.: US 8,176,674 B2
(45) Date of Patent: May 15, 2012

(54) ROLLER ASSEMBLY FOR FISHING ROD ROLLER GUIDE

(76) Inventor: Yi-Te Lin, Tainan (TW)

( * ) Notice: Subject to any disclaimer, the term of this patent is extended or adjusted under 35 U.S.C. 154(b) by 492 days.

(21) Appl. No.: 12/563,146

(22) Filed: Sep. 20, 2009

(65) Prior Publication Data

US 2011/0067291 A1  Mar. 24, 2011

(51) Int. Cl.
*A01K 87/04* (2006.01)
(52) U.S. Cl. ........................................ 43/24; 242/157 R
(58) Field of Classification Search ...... 43/24; 242/615, 242/615.2, 157 R, 140, 157.1; 254/411
See application file for complete search history.

(56) References Cited

U.S. PATENT DOCUMENTS 2,878,608 A * 3/1959 O'Brien, Jr. ............... 43/24
4,428,141 A * 1/1984 Kovalovsky ............... 43/24

FOREIGN PATENT DOCUMENTS

JP  2005095024 A  *  4/2005

* cited by examiner

*Primary Examiner* — Joshua J Michener

(57) ABSTRACT

A roller assembly for a fishing rod roller guide includes a roller having two receiving portions each receiving a bearing. A side cover is mounted to each of two ends of the roller and includes an inner side having a lip received in a first annular groove in the end of the roller. Each lip includes a second annular groove aligned with a peripheral flange on one of the ends of the roller. A ring made of soft material is partially received in each second annular groove. A gap is formed between each ring and a peripheral flange on one of the ends of the roller. A spacing portion is formed between the inner side of each side cover and one of the ends of the roller. Grease is received in the gaps and seals a portion of each bearing aligned with an end edge of one of the receiving portions.

4 Claims, 6 Drawing Sheets

ROLLER ASSEMBLY FOR FISHING ROD ROLLER GUIDE

BACKGROUND OF THE INVENTION

1. Field of the Invention

The present invention relates to a roller assembly for a roller guide and, more particularly, to a roller assembly for a fishing rod roller guide with smooth rotation and a prolonged service life.

2. Description of the Related Art

A type of fishing rod includes a plurality of roller guides each having a through-hole for receiving a fishing line, so that the moving direction of the fishing line can be controlled by the roller guides. To improve smooth movement of and to reduce wear to the fishing line, it is known to provide a roller assembly on the roller guide.

FIGS. 4 and 5 show a conventional roller assembly including a roller 1', two bearings 2', two side covers 3', an axle 4', and grease 5'. The roller 1' includes an annular recess 11' for receiving a fishing line or the like. An axial hole 12' extends from an end through the other end of the roller 1' and includes two flanges 121' on an inner periphery thereof and two abutting edges 122' on two ends thereof. The axial hole 12' further includes two receiving portions 123' receiving the bearings 2'. Each bearing 2' includes an inner ring 21' and an outer ring 22' receiving the inner ring 21'. The inner and outer rings 21' and 22' are rotatable relative to each other. The outer ring 22' has a diameter slightly smaller than the receiving portions 123' and includes a flange 221' abutting against one of the abutting edges 122'. The side covers 3' are respectively mounted to two ends of the roller 1'. Each side covers 3' includes an axial hole 31'. An inner side 32' of each side cover 31' includes a bulged portion 33' aligned with the inner ring 21' of one of the bearings 2'. Each side cover 3' includes a flange 34' on an outer periphery coupled to a frame to which the roller 1' is mounted. The axle 4' includes first and second axle rods 41' and 42' each having an enlarged end 411', 412' having a diameter lager than the axial hole 31' of each side cover 3'. The first axle rod 41' includes a screw hole 412'. The second axle rod 42' includes threading 422' for coupling with the screw hole 412'. The first axle rod 41' extends through the second axial holes 31' of the side covers 3' and the inner races 21' of the bearings 2'. The second axle rod 42' is threadedly coupled in the first axle rod 41'. After assembly, the bulged portions 33' of the side covers 3' abut against the inner rings 21' of the bearings 2'. Furthermore, a spacing a' is formed between the outer ring 22' of each bearing 2' and the inner side 32' of one of the side covers 3'. The grease 5' is viscous and immovable and received in the spacings a', allowing smooth rotation of the bearings 2' relative to the side covers 3' and avoiding the bearings 2' from rusting by preventing ambient moisture from entering the spacings a'. However, although the grease 5' does not flow, it still leaks out of the spacings a' under the action of centrifugal force when the roller 1' rotates at high speed. The sealing function is, thus, lost.

Thus, a need exists for an improved roller assembly for a roller guide to reliably avoid entrance of ambient moisture.

BRIEF SUMMARY OF THE INVENTION

The present invention solves this need and other problems in the field of sealing for roller guides by providing, in a preferred form, a roller assembly for a fishing rod roller guide includes a roller made of rigid material and having first and second ends spaced along an axis. The roller further includes a first axial hole extending from the first end through the second end. The first axial hole includes first and second receiving portions spaced along the axis. Each of the first and second ends of the roller includes a first annular groove radially outward of and spaced from one of the first and second receiving portions in a radial direction perpendicular to the axis. Each of the first and second ends of the roller further includes a peripheral flange surrounding one of the first annular grooves and extending along the axis away from a center of the roller. First and second bearings are respectively received in the first and second receiving portions. Each of the first and second bearings includes an inner ring and an outer ring receiving the inner ring. The inner and outer rings are rotatable relative to each other. The outer ring has a diameter slightly smaller than the first and second receiving portions. First and second side covers made of rigid material are respectively mounted to the first and second ends of the roller. Each of the first and second side covers includes inner and outer sides spaced along the axis and a second axial hole extending from the first side through the second side. The inner side of each of the first and second side covers includes a bulged portion abutting against the inner race of one of the first and second bearings. The inner side of each of the first and second side covers further includes a lip received in but not in contact with a peripheral wall and a bottom wall of one of the first annular grooves of the roller. The lip of each of the first and second side covers includes a second annular groove aligned with one of the peripheral flanges of the roller. First and second rings made of soft material are respectively mounted in the second annular grooves of the first and second side covers with a portion of each of the first and second rings outside of the second annular groove. An axle extends through the second axial holes of the first and second side covers and the inner races of the first and second bearings. A gap is formed between each of the first and second rings and one of the peripheral flanges of the roller. A spacing portion is formed between the inner side of each of the first and second side covers and one of the first and second ends of the roller. Viscous, immovable grease is received in the gaps and seals a top portion of each of the first and second bearings aligned with an end edge of one of the first and second receiving portions.

In the most preferred form, the gap between each of the first and second rings 4 and one of the peripheral flanges of the roller smaller than 0.3 mm. The bottom wall of the first annular groove of the first end of the roller has a spacing to the center of the roller than the end edge of the first receiving portion. The bottom wall of the first annular groove of the second end of the roller has a spacing to the center of the roller than the end edge of the second receiving portion. The inner side of the first side cover further includes a third annular groove radially inward of the second annular groove of the first side cover. The inner side of the second side cover further includes a fourth annular groove radially inward of the second annular groove of the second side cover. The third and fourth annular grooves receive the grease. The spacing portion between the inner side of each of the first and second side covers and one of the first and second ends of the roller is zigzag. Each of the first and second side covers includes a flange adapted to be coupled to a frame to which the roller is rotatably mounted. The axle includes first and second axle rods. Each of the first and second axle rods includes an enlarged end having a diameter lager than the second axial hole of each of the first and second side covers. The first axle rod includes a screw hole. The second axle rod includes threading for coupling with the screw hole. The first axle rod extends through the second axial holes of the first and second side covers and the inner races of the first and second bearings. The second axle rod is threadedly coupled in the first axle rod.

Since the first and second rings and the first and second side covers do not abut against the roller, rotation of the roller is smooth. Furthermore, the small gaps between the first and second rings and the peripheral flanges of the roller avoid movement of the grease along an outer periphery of the first and second rings. Further, since the spacing portions are zigzag, the grease would be blocked by the first and second rings and, thus, less likely to move outside of the spacing portions under the action of centrifugal force when the roller rotates. Ambient moisture is less likely to permeate into the roller, preventing the first and second bearings from rusting and prolonging the service life of the roller guide.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

Figure 1:
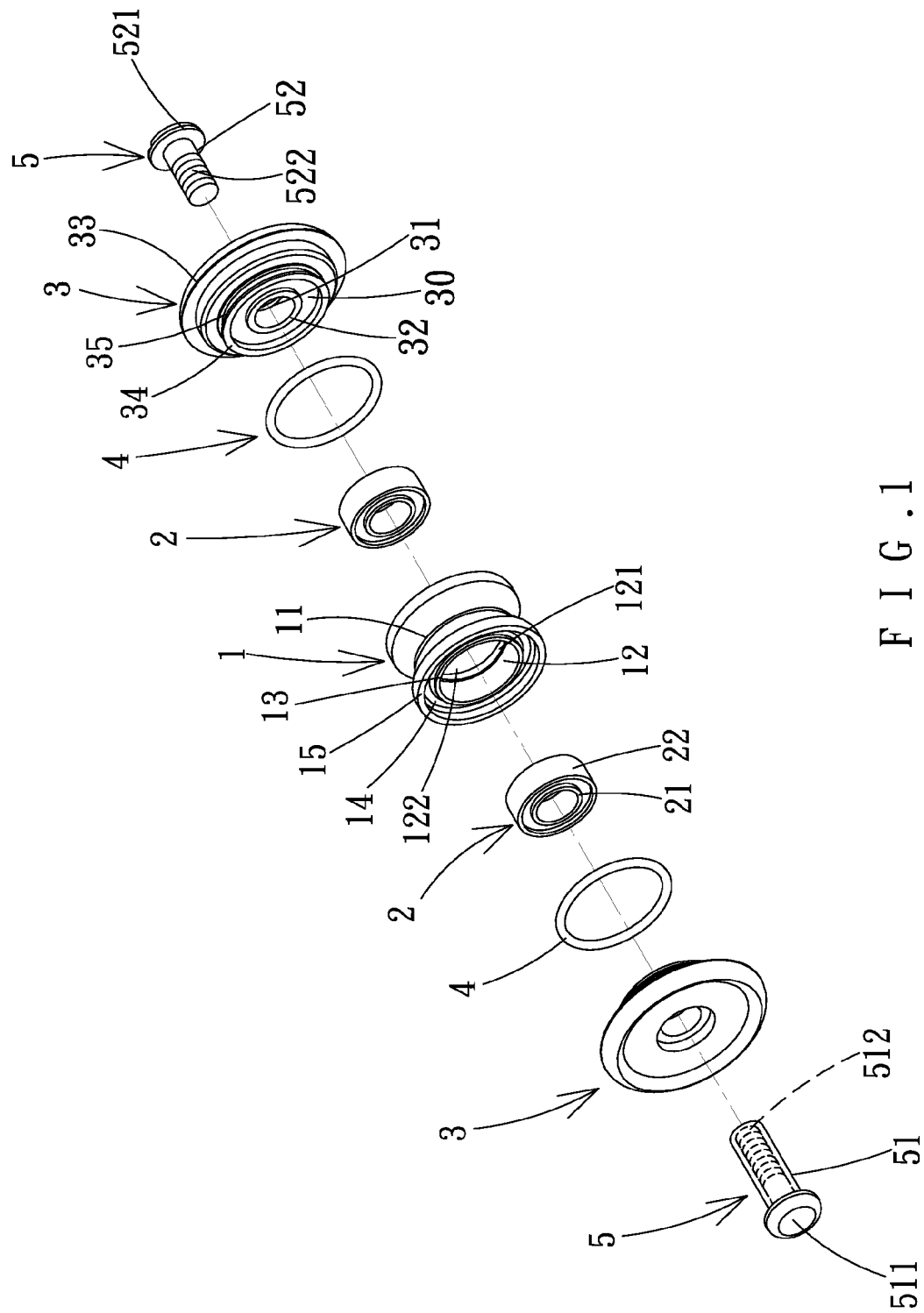
FIG. 1 shows an exploded, perspective view of a roller assembly for a fishing rod roller guide according to the preferred teachings of the present invention.
Figure 2:
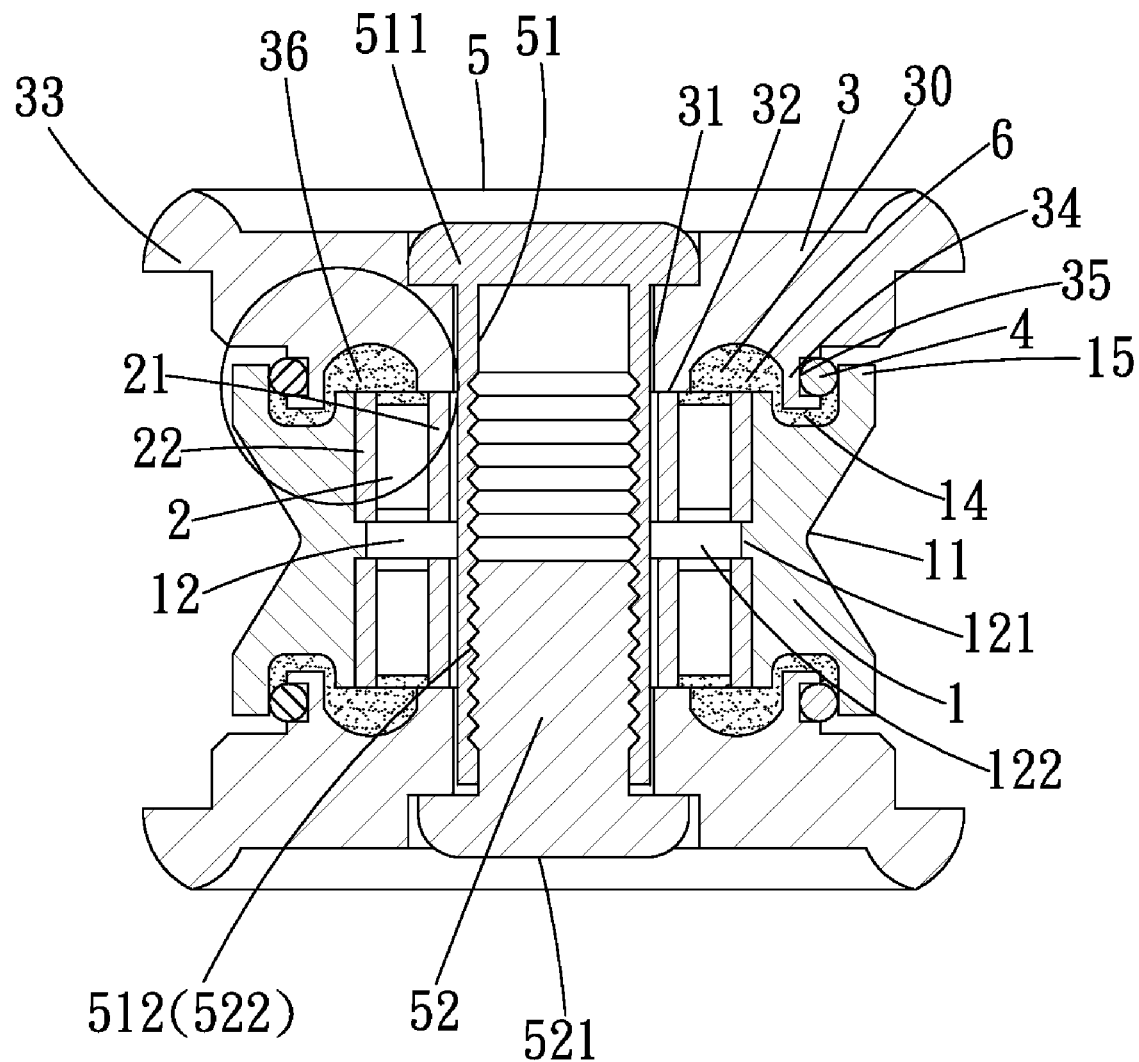
FIG. 2 shows a cross sectional view of the roller assembly of FIG. 1.
Figure 2A:
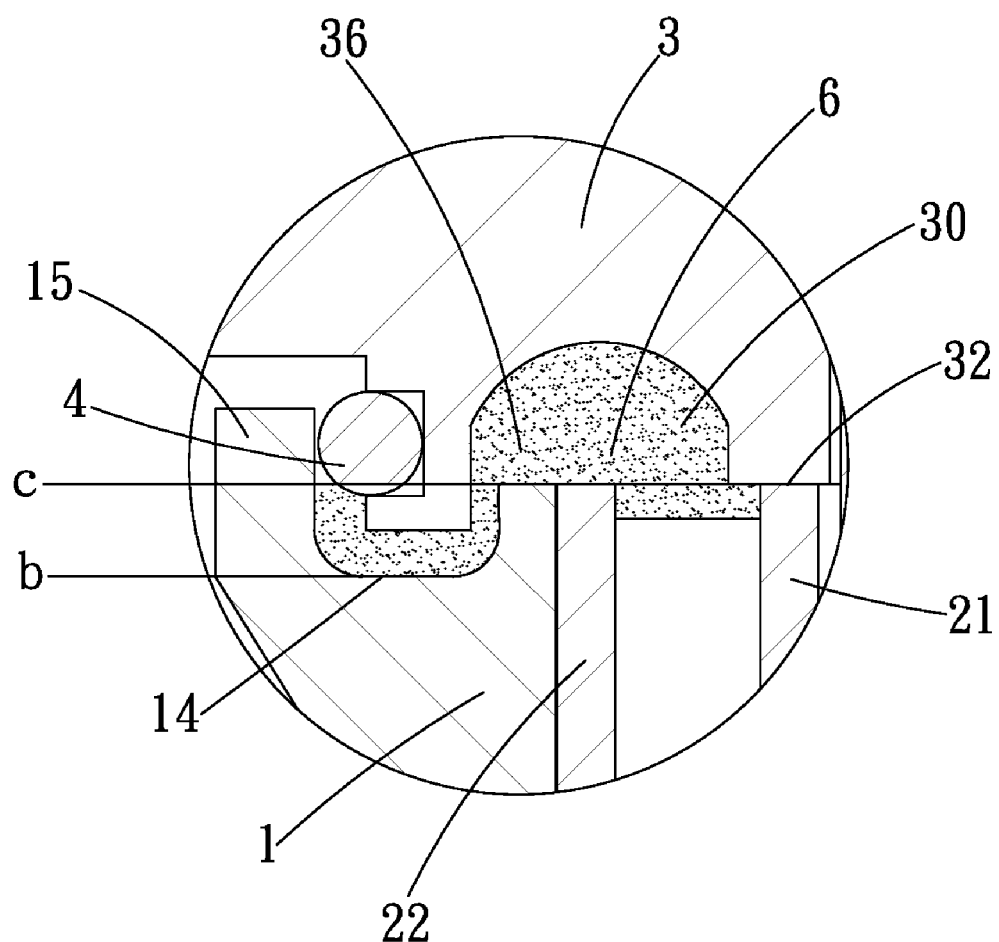
FIG. 2A shows an enlarged view of a circled portion in FIG. 2.

All figures are drawn for ease of explanation of the basic teachings of the present invention only; the extensions of the figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

A roller assembly for a fishing rod roller guide according to the preferred teachings of the present invention is shown in the drawings and generally includes a roller 1, first and second bearings 2, first and second side covers 3, first and second rings 4, an axle 5, and grease 6.

The roller 1 is made of rigid material and includes first and second ends 13 spaced along an axis. The roller 1 includes an annular recess 11 in an outer periphery thereof for receiving a fishing line or the like. The roller 1 further includes a first axial hole 12 extending from the first end 13 through the second end 13. The first axial hole 12 includes two abutting edges 121 formed on an inner periphery thereof. The first axial hole 12 further includes first and second receiving portions 122 spaced along the axis. Each of the first and second ends 13 of the roller 1 includes a first annular groove 14 radially outward of and spaced from one of the first and second receiving portions 122 in a radial direction perpendicular to the axis. Each of the first and second ends 13 of the roller 1 further includes a peripheral flange 15 surrounding one of the first annular grooves 14 and extending along the axis away from a center of the roller 1. A bottom wall b of the first annular groove 14 of the first end 13 of the roller 1 has a spacing to the center of the roller 1 than an end edge c of the first receiving portion 122. A bottom wall b of the first annular groove 14 of the second end 13 of the roller 1 has a spacing to the center of the roller 1 than an end edge c of the second receiving portion 122.

The first and second bearings 2 are respectively received in the first and second receiving portions 122. Each of the first and second bearings 2 includes an inner ring 21 and an outer ring 22 receiving the inner ring 21. The inner and outer rings 21 and 22 are rotatable relative to each other. The outer ring 22 has a diameter slightly smaller than the first and second receiving portions 122 and includes a lower end abutting one of the abutting edges 121 and a top portion aligned with the end edge c of one of the first and second receiving portions 122.

Figure 3:
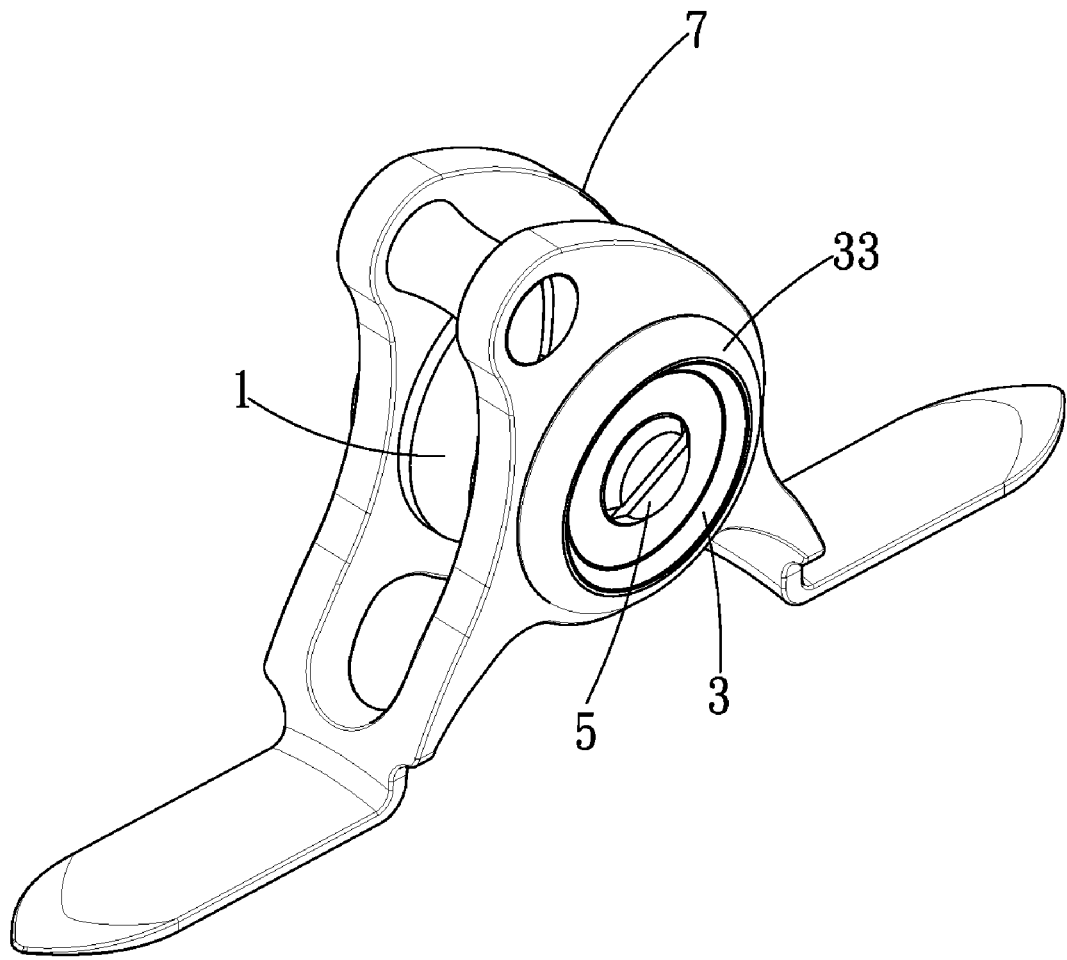
FIG. 3 shows a perspective view of the roller assembly of FIG. 1 and a frame to which the roller assembly is rotatably mounted.
Figure 4:
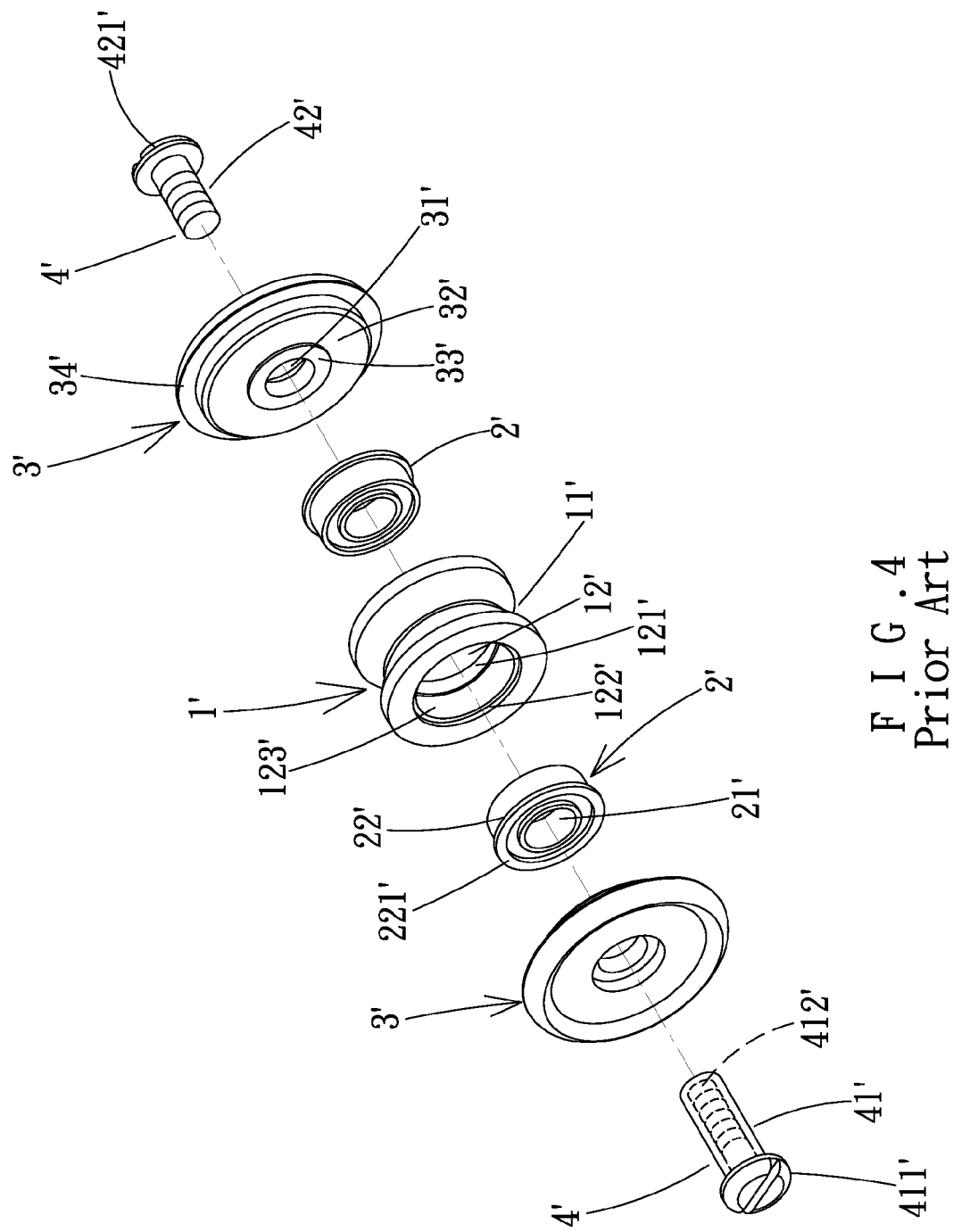
FIG. 4 shows an exploded, perspective view of a conventional roller assembly for a roller guide.
Figure 5:
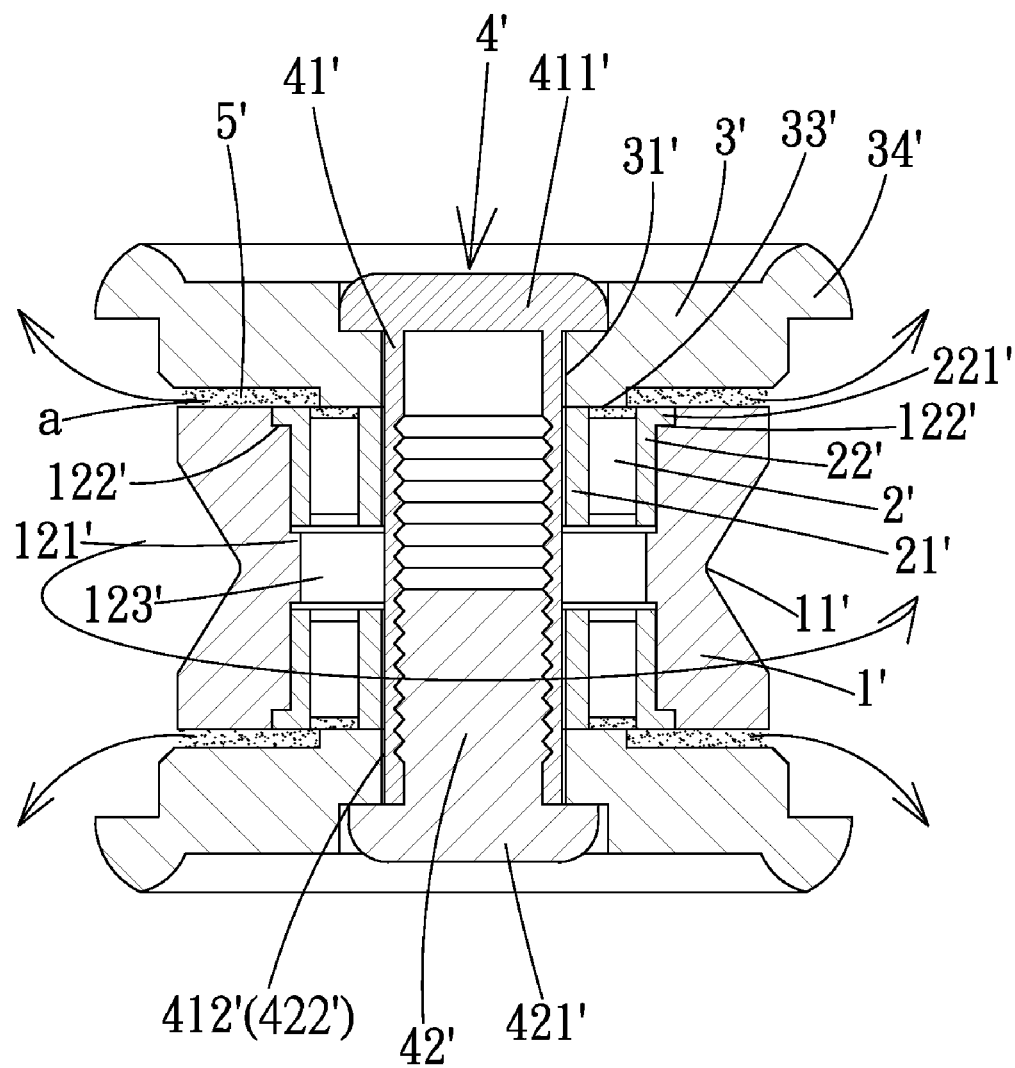
FIG. 5 shows a cross sectional view of the roller assembly of FIG. 4.

The first and second side covers 3 are made of rigid material and respectively mounted to the first and second ends 13 of the roller 1. Each of the first and second side covers 3 includes inner and outer sides spaced along the axis and a second axial hole 31 extending from the first side through the second side. The inner side of each of the first and second side covers 31 includes a bulged portion 32. Each of the first and second side covers 3 includes a flange 33 adapted to be coupled to a frame 7 (FIG. 3) to which the roller 1 is rotatably mounted. The inner side of each of the first and second side covers 31 further includes a lip 34 received in but not in contact with a peripheral wall and the bottom wall b of one of the first annular grooves 14 of the roller 1. The lip 34 of each of the first and second side covers 3 includes a second annular groove 35 aligned with one of the peripheral flanges 15 of the roller 1. The inner side of the first side cover 3 further includes a third annular groove 30 radially inward of the second annular groove 35 of the first side cover 3. The inner side of the second side cover 3 further includes a fourth annular groove 30 radially inward of the second annular groove 35 of the second side cover 3. The third and fourth annular grooves 30 receive the grease 6.

The first and second rings 4 are made of soft, elastic material such as rubber. The first and second rings 4 are respectively mounted in the second annular grooves 35 of the first and second side covers 3 with a portion of each of the first and second rings 4 outside of the second annular grooves 35.

The axle 5 includes first and second axle rods 51 and 52. Each of the first and second axle rods 51 and 52 includes an enlarged end 511, 512 having a diameter lager than the second axial hole 31 of each of the first and second side covers 3. The first axle rod 51 includes a screw hole 512. The second axle rod 52 includes threading 522 for coupling with the screw hole 512. The first axle rod 51 extends through the second axial holes 31 of the first and second side covers 3 and the inner races 21 of the first and second bearings 2. The second axle rod 52 is threadedly coupled in the first axle rod 51. After assembly, the bulged portions 32 of the first and second side covers 3 abut against the inner races 21 of the first and second bearings 21. Furthermore, a gap (preferably smaller than 0.3 mm) is formed between each of the first and second rings 4 and one of the peripheral flanges 15 of the roller 1. A zigzag spacing portion 36 is formed between the inner side of each of the first and second side covers 3 and one of the first and second ends 13 of the roller 1. The grease 6 is viscous and immovable and received in the spacing portions 36. Thus, the grease 6 seals the top portions of the first and second bearings 22.

Since the first and second rings 4 and the first and second side covers 3 do not abut against the roller 1, rotation of the roller 1 is smooth. Furthermore, the small gaps between the first and second rings 4 and the peripheral flanges 15 of the roller 1 avoid movement of the grease 6 along an outer periphery of the first and second rings 4. Further, since the spacing portions 36 are zigzag, the grease 6 would be blocked by the first and second rings 4 and, thus, less likely to move outside of the spacing portions 36 under the action of centrifugal force when the roller 1 rotates. Ambient moisture is less likely to permeate into the roller 1, preventing the first and second bearings 2 from rusting and prolonging the service life of the roller guide.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A roller assembly for a fishing rod roller guide comprising:
   a roller made of rigid material and including first and second ends spaced along an axis, with the roller further including a first axial hole extending from the first end through the second end, with the first axial hole including first and second receiving portions spaced along the axis, with each of the first and second ends of the roller including a first annular groove radially outward of and spaced from one of the first and second receiving portions in a radial direction perpendicular to the axis, with each of the first and second ends of the roller further including a peripheral flange surrounding one of the first annular grooves and extending along the axis away from a center of the roller;
   first and second bearings respectively received in the first and second receiving portions, with each of the first and second bearings including an inner ring and an outer ring receiving the inner ring, with the inner and outer rings being rotatable relative to each other, with the outer ring having a diameter slightly smaller than the first and second receiving portions;
   first and second side covers made of rigid material and respectively mounted to the first and second ends of the roller, with each of the first and second side covers including inner and outer sides spaced along the axis and a second axial hole extending from the first side through the second side, with the inner side of each of the first and second side covers including a bulged portion abutting against the inner race of one of the first and second bearings, with the inner side of each of the first and second side covers further including a lip received in but not in contact with a peripheral wall and a bottom wall of one of the first annular grooves of the roller, with the lip of each of the first and second side covers including a second annular groove aligned with one of the peripheral flanges of the roller;
   first and second rings made of soft material and respectively mounted in the second annular grooves of the first and second side covers with a portion of each of the first and second rings outside of the second annular groove;
   an axle extending through the second axial holes of the first and second side covers and the inner races of the first and second bearings, with a gap formed between each of the first and second rings and one of the peripheral flanges of the roller, with a spacing portion formed between the inner side of each of the first and second side covers and one of the first and second ends of the roller; and
   viscous, immovable grease received in the gaps and sealing a top portion of each of the first and second bearings aligned with an end edge of one of the first and second receiving portions.

2. The roller assembly as claimed in claim 1, with the gap between each of the first and second rings and one of the peripheral flanges of the roller smaller than 0.3 mm.

3. The roller assembly as claimed in claim 1, with the bottom wall of the first annular groove of the first end of the roller having a spacing to the center of the roller than the end edge of the first receiving portion, with the bottom wall of the first annular groove of the second end of the roller having a spacing to the center of the roller than the end edge of the second receiving portion, with the inner side of the first side cover further including a third annular groove radially inward of the second annular groove of the first side cover, with the inner side of the second side cover further including a fourth annular groove radially inward of the second annular groove of the second side cover, with the third and fourth annular grooves receiving the grease, and with the spacing portion between the inner side of each of the first and second side covers and one of the first and second ends of the roller being zigzag.

4. The roller assembly as claimed in claim 1, with each of the first and second side covers including a flange adapted to be coupled to a frame to which the roller is rotatably mounted, with the axle including first and second axle rods, with each of the first and second axle rods including an enlarged end having a diameter lager than the second axial hole of each of the first and second side covers, with the first axle rod including a screw hole, with the second axle rod including threading for coupling with the screw hole, with the first axle rod extending through the second axial holes of the first and second side covers and the inner races of the first and second bearings, and with the second axle rod threadedly coupled in the first axle rod.

* * * * *